US011704301B2

(12) United States Patent
Pancha et al.

(10) Patent No.: US 11,704,301 B2
(45) Date of Patent: Jul. 18, 2023

(54) REDUCING FILE SYSTEM CONSISTENCY CHECK DOWNTIME

(71) Applicant: International Business Machines Corporation, Armonk, NY (US)

(72) Inventors: Huzefa Pancha, Pune (IN); Abhishek Jain, Baraut (IN); Sasikanth Eda, Vijayawada (IN); Karthik Iyer, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 355 days.

(21) Appl. No.: 17/018,326

(22) Filed: Sep. 11, 2020

(65) Prior Publication Data

US 2022/0083530 A1 Mar. 17, 2022

(51) Int. Cl.
  *G06F 16/23* (2019.01)
  *G06F 9/30* (2018.01)
  *G06F 9/50* (2006.01)
  *G06F 16/22* (2019.01)

(52) U.S. Cl.
  CPC ........ *G06F 16/2365* (2019.01); *G06F 9/3009* (2013.01); *G06F 9/5027* (2013.01); *G06F 16/2282* (2019.01); *G06F 16/2343* (2019.01)

(58) Field of Classification Search
  CPC ............. G06F 16/2365; G06F 16/2343; G06F 16/2282; G06F 9/3009; G06F 9/5027
  See application file for complete search history.

(56) References Cited

U.S. PATENT DOCUMENTS

| | | | | |
|---|---|---|---|---|
| 7,120,762 B2* | 10/2006 | Rajwar | .................. | G06F 9/528 |
| | | | | 712/E9.05 |
| 7,698,708 B1* | 4/2010 | Lent | ........................ | G06F 9/524 |
| | | | | 718/104 |
| 8,316,066 B1* | 11/2012 | Srinivasan | ............ | G06F 16/134 |
| | | | | 707/828 |
| 8,577,855 B2 | 11/2013 | Shyam et al. | | |

(Continued)

FOREIGN PATENT DOCUMENTS

WO   2016130167 A1   8/2016

OTHER PUBLICATIONS

Elston, J., "What is metadata, and how does it aid in the "fsck" process?" https://unix.stackexchange.com/questions/23252/what-is-metadata-and-how-does-it-aid-in-the-fsck-process, printed May 6, 2020, 1 pg.

(Continued)

*Primary Examiner* — Jensen Hu
(74) *Attorney, Agent, or Firm* — Robert J. Shatto

(57) ABSTRACT

Provided is a method for performing a file system consistency check. The method comprises calculating, by a first thread that does not have access to an inode table, file block addresses for one or more files to be checked by the thread. The method further comprises collecting validity information for the one or more files. The method further comprises reading information relating to the one or more files from the inode table. The reading is performed in response to the thread being given access to the inode table after the calculating operation. The method further comprises validating the information by comparing the information from the inode table to the validity information.

20 Claims, 7 Drawing Sheets

(56) References Cited

U.S. PATENT DOCUMENTS

| | | |
|---|---|---|
| 2008/0126539 A1* | 5/2008 | Banerjee .............. G06F 9/5027 |
| | | 709/224 |
| 2008/0189343 A1 | 8/2008 | Hyer et al. |
| 2012/0117035 A1 | 5/2012 | Ranade et al. |
| 2018/0293265 A1 | 10/2018 | Eda et al. |
| 2021/0382869 A1* | 12/2021 | Pancha .................. G06F 3/067 |

OTHER PUBLICATIONS

Fryer et al., "Recon: Verifying File System Consistency at Runtime," https://dl.acm.org/doi/10.1145/2385603.2385608, ACM Transactions on Storage, 14 pgs., Dec. 2012.

Mell et al., "The NIST Definition of Cloud Computing," Recommendations of the National Institute of Standards and Technology, U.S. Department of Commerce, Special Publication 800-145, Sep. 2011, 7 pgs.

Microsoft, "Understanding block blobs, append blobs, and page blobs," https://docs.microsoft.com/en-us/rest/api/storageservices/understanding-block-blobs--append-blobs-and-page-blobs, Mar. 4, 2020, printed May 6, 2020, 3 pgs.

Unknown, "Linux filesystems: definition, structure, selection, optimization," http://www.linfo.org/filesystem.html, created Apr. 16, 2004, printed May 6, 2020, created Apr. 16, 2004, 5 pgs.

* cited by examiner

REDUCING FILE SYSTEM CONSISTENCY CHECK DOWNTIME

BACKGROUND

The present disclosure relates generally to the field of computing, and more particularly to reducing the downtime caused by file system consistency check operations.

Data for a file system can be corrupted if errors are encountered during, for example, a write operation. As an example, a file system can become corrupted if the computer hosting the file system crashes in the middle of a write operation. Accordingly, computer systems often include utilities to identify and correct errors in file system data.

SUMMARY

Embodiments of the present disclosure include a method, computer program product, and system for performing a file system consistency check. The method comprises calculating, by a first thread that does not have access to an inode table, file block addresses for one or more files to be checked by the thread. The method further comprises collecting validity information for the one or more files. The method further comprises reading information relating to the one or more files from the inode table. The reading is performed in response to the thread being given access to the inode table after the calculating operation. The method further comprises validating the information by comparing the information from the inode table to the validity information.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
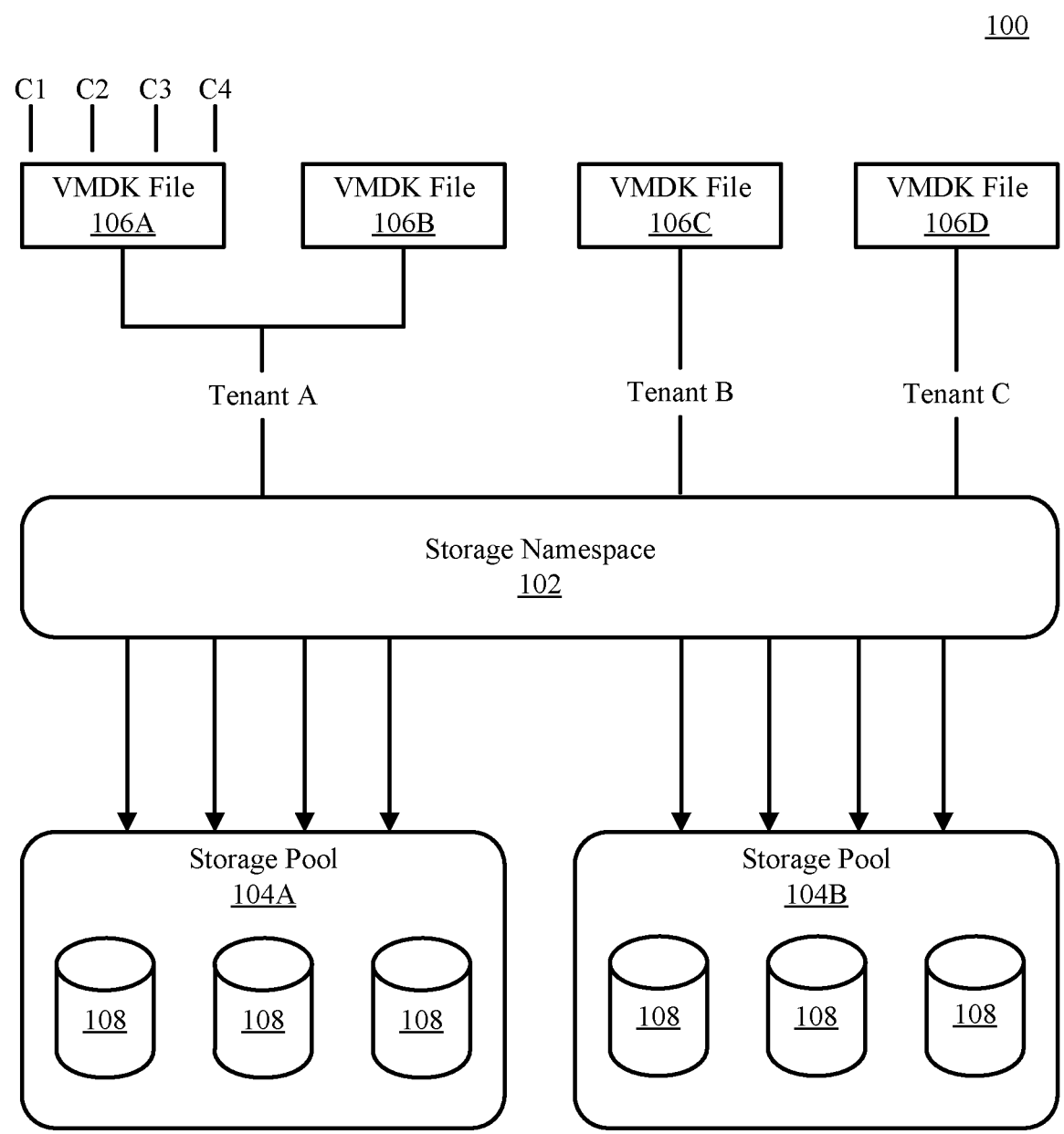
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to reducing the downtime caused by file system consistency check operations. While the present disclosure is not necessarily limited to such applications, various aspects of the disclosure may be appreciated through a discussion of various examples using this context.

It is to be understood in advance that while embodiments of the present disclosure discuss implementation of a new file system consistency check process in Linux®, the present disclosure is not limited to Linux or UNIX® file systems (LINUX is a registered trademark owned by Linus Torvalds, UNIX is a registered trademark owned by X/OPEN COMPANY LIMITED CORPORATION, UNITED KINGDOM THAMES TOWER, 37-45 STATION ROAD READING, BERKSHIRE RG1 1LX UNITED KINGDOM). Instead, embodiments of the present disclosure may be implemented using any suitable operating system or file system. Embodiments described herein using Linux are provided as illustrative examples, and are not to be construed as limiting.

In a Linux/UNIX file system, the basic unit of storage is called an inode. Each inode contains information about a file. For example, an inode may include (1) its inode number (a unique identification number), (2) the owner and group associated with the file, (3) the file type (e.g., whether it is a regular file or a directory), (4) the file's permission list, (5) the file creation, access, and modification times, (6) the size of the file, and/or (7) the disk address(es) for the file (i.e., the location(s) on the disk where the file is physically stored). An individual inode can either contain actual file data, directory information (metadata), or be unused (free). The act of creating a new file in a Linux file system involves changing the state of an inode from free to allocated, writing data to the new file, and writing metadata to a directory file.

It is possible for a computer to crash in the middle of this type of operation. If that occurs, the file system can be corrupted. Accordingly, Linux includes a system utility for correcting damaged file systems, called a file system consistency check (or fsck). A similar tool exists in Windows®-based operating systems. Generally, fsck is run automatically based on need or a predetermined schedule, or manually by a system administrator. File system consistency check operations, such as the Linux fsck, can be performed in two modes: offline and online. The online mode performs the file system consistency check on a mounted file system, whereas the offline mode operates on an unmounted file system. As such, the online mode is often used in systems that cannot tolerate long downtimes, such as cloud systems. A drawback of online mode file system consistency checks is that they are normally capable of performing fewer corrective actions compared to offline mode. Meanwhile, the offline mode is often used when more comprehensive corrective actions may be needed and in system that can tolerate longer downtimes (e.g., systems that are already down for other maintenance).

File system consistency checking consists of reading all the inodes and attempting to resolve as many corruption issues as possible. A file system consistency check operation has three main steps, each of which may include one or more additional sub-steps. At step one, a thread reads a fixed number of rows from an inode table (each row corresponding to an inode). At step two, the thread checks the data disk and metadata disk for validity information. At step three, the thread validates the inode information for the set of inode rows that it read at step one and corrects any errors that are encountered. After validating each of the inodes assigned to the thread, the thread dies or completes.

When performing an online file system consistency check in a busy software defined environment, the effective number of fsck threads working on an inode table could be limited even though the fsck process has spun (e.g., activated, obtained, selected) enough threads to achieve the service-level agreements (SLAs) (e.g., complete within the promised downtime). This is due to inode table connections consumed by other processes (e.g., application lock related processes, system maintenance, or external monitoring related). In such cases, some of the fsck threads (e.g., software threads that have been assigned the task of performing fsck operations) remain in a waiting mode to read the inode entries from the inode table for further verification process. The waiting threads can only start working when the active fsck threads (i.e., the ones that are not waiting) complete their processing (i.e., finish step three discussed above). This is a non-optimized scenario, especially in the case of fixed size binary large objects (blobs) or a busy erasure code file storage, and can cause the promised SLAs to not be achieved, thereby resulting in performance and revenue loss.

For example, consider a scenario where due to system configuration and a heavy workload (a very common case in containers hosted cloud operating file system), a storage system has a thread limit of three, which means that it allows only three fsck threads (i.e., software threads performing fsck operations) access to the inode table at a time. Additionally, assume that each of the three threads is only permitted to read a fixed number of rows from the inode table, in this case three rows. This means that nine inode instances can be read at any given time from the inode table to start step one of the whole fsck process. Now assume that the fsck process has spun more than three threads from the system thread pool. Only the first three threads will be able to access the inode table, and the remaining threads will be stuck waiting to start due to number of inode table access limitation. In other words, the remaining fsck threads need to wait for their chance to access the inode table. This results in an inefficient use of the threads because the excess threads are unable to do anything except wait.

Embodiments of the present disclosure may address the inefficient use of fsck threads and allow the waiting threads (i.e., those that do not have access to the inode table) to perform some of the necessary data collection steps while waiting for access to the inode table. Embodiments include a method for more efficiently performing online file system consistency check by altering the fsck scan steps within a single file scan per thread, where the information such as file size is known/configured by the clustered file system and all erasure code blocks corresponding to a file are stored in a sequential fashion on the disk drives configured for the file system. In some embodiments, one or more threads will perform traditional scanning steps (i.e., performs steps one through three described above in order) for a first inode, while one or more other threads (e.g., the waiting threads) will perform a modified fsck process.

For example, a first thread may be assigned a first set of inodes in an inode table. Because the first thread has access to the inode table, it may perform a traditional fsck process on its assigned inodes. Meanwhile, a second thread that does not currently have access to the inode table may be assigned a second set of inodes. Instead of doing nothing until it has access to the inode table, the second thread performs step two directly to collect validity information for the block ranges that will be assigned to it. In other words, the second thread (which is a waiting thread) performs step two prior to performing step one. This is done by the system identifying/estimating the next block ranges due to the sequential writes and fixed file sizes, which are known to the system. Once the second thread gains access to the inode table (e.g., after a first thread finished validating its inodes), the second thread performs step one and compares the data it has already collected with the data read from the corresponding row in the inode table. The second thread then performs step three and marks corrupt or non-corrupt inodes.

By having each waiting thread predictively perform step two for its set of inodes using known information such as file size before being able to access the inode table, the fsck process is better optimized to achieve reduced downtime. This is because the wait time (i.e., when the thread does not have access to the inode table) is normally entirely wasted, whereas embodiments of the present disclosure enable threads to use this time to collect validity information for their respective inodes (e.g., files).

There are numerous problems with a file system that a file system consistency check as disclosed herein can correct. For example, inodes may be marked as allocated even though they do not belong to any file. The corrective action is to mark the inode as free in the allocation map. There may be files and directories for which an inode is allocated and no directory entry exists, known as orphaned files. The corrective action is to create directory entries for these files in a "lost and found" subdirectory in the root directory. There may be directory entries that point to an inode that is not allocated. The corrective action is to remove the directory entry. There may be incorrectly formed directory entries. A directory file contains the inode number and the generation number of the file to which it refers. When the generation number in the directory does not match the generation number that is stored in the file's inode, the corrective action is to remove the directory entry. There may be incorrect link counts on files and directories. The corrective action is to update them with accurate counts. Additionally, the disclosed file system consistency check may correct other inconsistencies such as the file system having missing or corrupted metadata, problems with the directory structure related to volumes, a missing or corrupted root directory, or other problems in internal data structures.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 4:
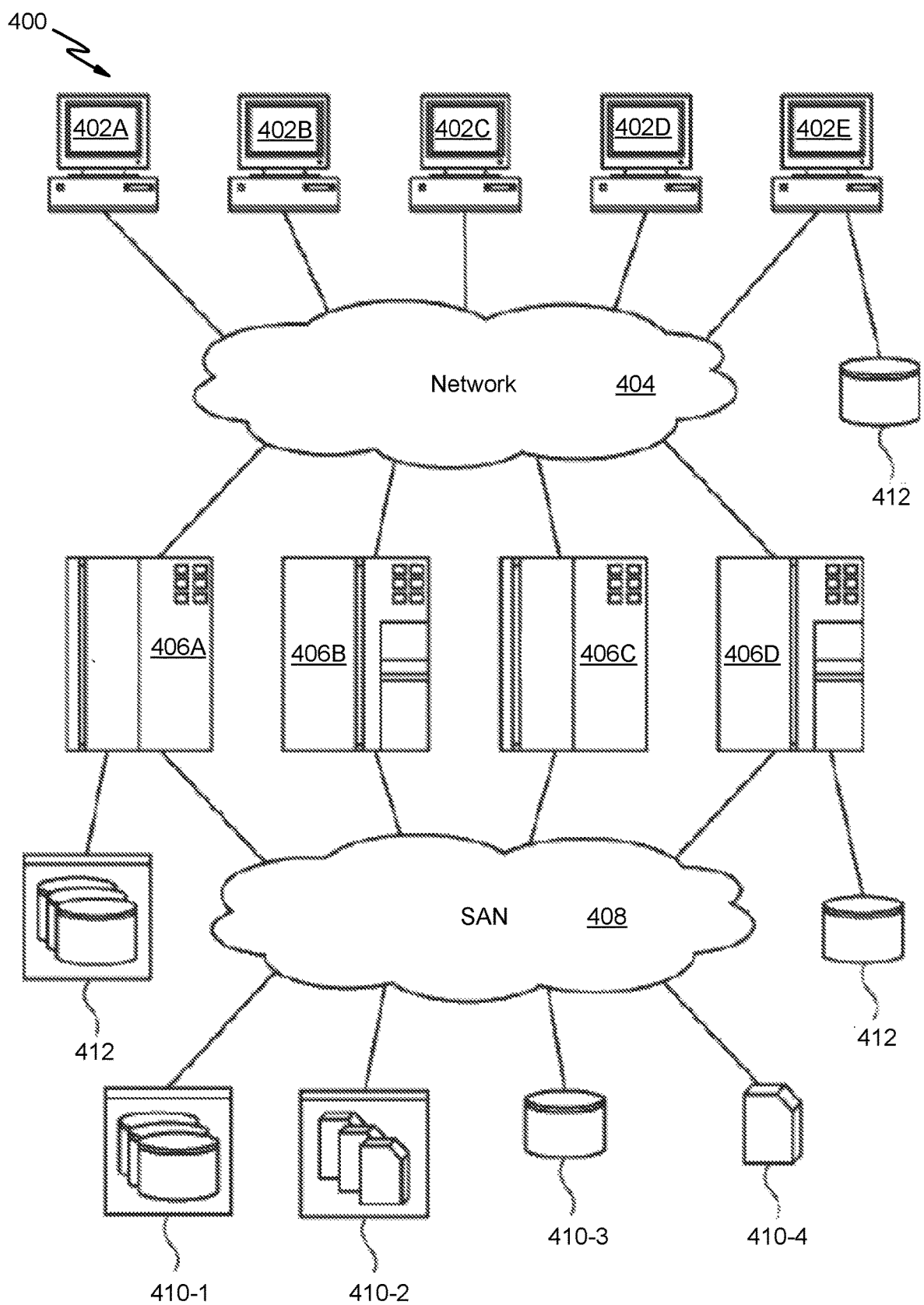
FIG. 4 illustrates an example network architecture, in accordance with embodiments of the present disclosure.

Turning now to the figures, FIG. 1 illustrates a block diagram of an example computing environment 100 in which illustrative embodiments of the present disclosure may be implemented. The computing environment 100 is a containerized environment that uses a clustered file system which includes virtual machine disk (VMDK) files (e.g., using blob storage). In certain embodiments, the computing environment 100 is part of a larger storage system (e.g., a storage area network (SAN) environment as shown in FIG. 4) that includes a cluster system having multiple storage controllers configured to manage storage volumes for the storage system.

The computing environment 100 includes a plurality of VMDK files 106A-106D (collectively or individually referred to as VMDK file(s) 106) utilizing a storage namespace 102. The storage namespace 102 may be common to each of the VMDK files 106, as shown in FIG. 1. In some embodiments, there may be multiple storage namespaces 102, and different VMDK files 106 may utilize different storage namespaces 102. For example, a cloud computing system may have one or more storage namespaces that are shared among some tenants, while other tenants may have a dedicated storage namespace.

The VMDK files 106 may belong to a one or more of tenants. For example, as depicted in FIG. 1, a first tenant (Tenant A) is associated with a first VMDK file 106A and a second VMDK file 106B, a second tenant (Tenant B) is associated with a third VMDK file 106C, and a third tenant (Tenant C) is associated with a third VMDK file 106D. Each VMDK file 106 may contain all of the information for a virtual machine. In some embodiments, one or more of the VMDK files 106 may include information for one or more containers to be run within the computing environment 100. For example, the first VMDK file 106A, as depicted, includes information for four containers C1, C2, C3, and C4.

The storage namespace 102 may utilize one or more storage pools. For example, as depicted in FIG. 1, the storage namespace 102 includes a first storage pool 104A and a second storage pool 104B (collectively or individually referred to as storage pool(s) 104). The storage pools 104 may be co-located and/or they may be geographically separated. For example, the first storage pool 104A may be in a first geographical area, and the second storage pool 104B may be in a second geographical area. Each storage pool 104 may include a set of physical storage devices 108, such as hard disk drives (HDDs), solid state drives (SSDs), Electrically Erasable Programmable Read-Only Memory (EEPROM), flash memory, flash disk, Random-Access Memory (RAM), storage-class memory (SCM), Phase Change Memory (PCM), Resistive Random-Access Memory (RRAM), optical disk, tape, etc. The storage pools 104 may additionally contain other hardware, such as memory or disk array controllers, to enable accessing the physical storage devices 108. For example, in some embodiments, the storage pools 104 may be set up using a redundant array of independent disks (RAID) array, and the storage pools 104 may include a RAID controller.

Data may be stored on the physical storage devices 108 using erasure coding to protect data stored in the storage pools. Accordingly, the data may be broken into fragments, expanded, encoded with redundant data pieces, and stored across a set of different locations or storage media (e.g., in different physical storage devices 108 or even in different storage pools 104). The data may be sequentially written to the physical storage devices 108.

The computing environment 100 may be embedded within one or more server computer systems, such as a storage server or storage node, referred to herein as a host device. Applications or users may access the data stored within the computing environment 100 using one or more remote devices (not shown). The remote device and the host device may be configured to communicate with each other through an internal or external network interface. The network interfaces may be, e.g., modems or network interface cards. For example, the network interfaces may enable the host device and the remote device to communicate with each other using a network.

The remote device and/or the host device may be equipped with a display or monitor. Additionally, the remote device and/or the host device may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device and/or the host device may be servers, desktop computers, laptop computers, or hand-held devices (e.g., smartphones or tablets).

The remote device and the host device may be distant from each other and communicate over a network. In some embodiments, the host device may be a central hub from which one or more remote devices can establish a communication connection, such as in a client-server networking model. Alternatively, the host device and remote device may be configured in any other suitable networking relationship (e.g., in a peer-to-peer configuration or using any other network topology).

In some embodiments, the network can be implemented using any number of any suitable communications media. For example, the network may be a wide area network (WAN), a local area network (LAN), an internet, or an intranet. In certain embodiments, the remote device and the host device may be local to each other and communicate via any appropriate local communication medium. For example, the remote device and the host device may communicate using a local area network (LAN), one or more hardwire connections, a wireless link or router, or an intranet. In some embodiments, the remote device and the host device may be communicatively coupled using a combination of one or more networks and/or one or more local connections. For example, the remote device may be hardwired to the host device (e.g., connected with an Ethernet cable) while the second remote device may communicate with the host device using a wireless network (e.g., over the Internet).

In some embodiments, the network may be a telecommunication network. The telecommunication network may include one or more cellular communication towers, which may be a fixed-location transceiver that wirelessly communicates directly with a mobile communication terminal (e.g., remote device). Furthermore, the network may include one or more wireless communication links to enable transmissions between the remote device and the host device. The wireless communications links may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), 4G long-term evolution (LTE), fifth-generation (5G), or any other wireless communication technology or standard to establish a wireless communications link.

In some embodiments, the network can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
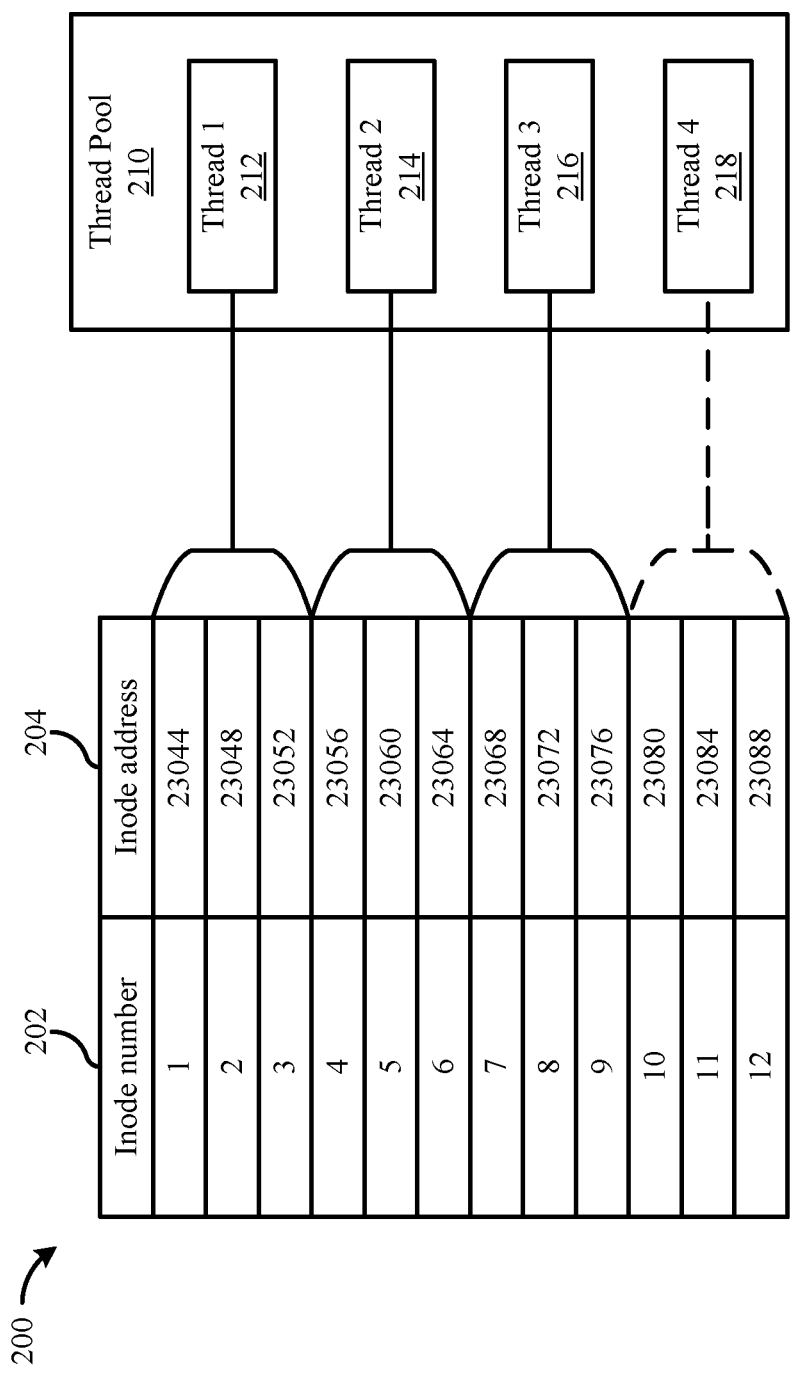
FIG. 2 illustrates a diagram of a plurality of threads performing a file system consistency check of a file system, in accordance with embodiments of the present disclosure.

Referring now to FIG. 2, illustrated is a diagram of a plurality of threads performing a file system consistency check of a file system, in accordance with embodiments of the present disclosure. The embodiment shown in FIG. 2 may be utilized to more efficiently perform online file system consistency checks by altering the fsck scan steps within a single file scan per thread. FIG. 2 includes a thread pool 210 that includes a plurality of threads 212-218 that are performing a fsck process on an inode table 200 for the file system. In some embodiments, each system node has its own thread pool, and in a clustered file system, there is a combined thread pool where all nodes' threads may perform any task related to the file system operations. The inode table 200 includes a plurality of inodes, each of which includes an inode number 202 and an inode address 204. Each inode is represented as an entry (i.e., row) in the inode table 200.

As shown in FIG. 2, the file size for the file system is uniform, and the files are stored sequentially in the hard drive. This is evidenced by the consistently increasing inode addresses 204 in the inode table 200. For example, the difference between the inode address 204 for the first inode (inode 1) and the inode address 204 for the second inode (inode 2) is four. Likewise, the difference between the inode address 204 for the second inode and the inode address for the third inode (inode 3) is four. This fixed file size is known to the file system.

For example, embodiments of the present disclosure may be applied to systems that use binary large object (blob) storage. In blob storage, once a blob (e.g., an image, audio, file, or other object) has been created, its type cannot be changed, and it can be updated only by using operations appropriate for that blob type. Example operations that may be performed on blobs include, but are not limited to, writing a block or list of blocks to a block blob, appending blocks to a append blob, and writing pages to a page blob. Example workloads that suit blog storage include enterprise record management, in which records occupy fixed size, Customer Record Management (CRM), identity record storage, etc.

In the example shown in FIG. 2, there are four threads in the thread pool 210 that have been assigned to the fsck process. Additionally, the inode table 200 has a thread limit of three, meaning that only three threads can access the inode table at any given time, and each thread is permitted to read three rows of the inode table 200. In other words, each thread is assigned three inodes by the fsck process. Accordingly, the first three threads 212-216 are able to obtain a lock on the inode table 200 and begin performing the fsck operations on their respective inodes (e.g., rows). Meanwhile, a fourth thread 218 in the thread pool 210 is also assigned to perform the fsck process, but due to inode table 200 access limitations (thread limit) at any given point of time, the fourth thread 218 must wait for one of the other threads 212-214 to either complete or die during the execution stages before it can get access to the inode table 200. This is shown by the fourth thread 218 having a dashed line to its respective rows in the inode table 200 while the first three threads 212-216 have a solid line.

Whereas in traditional systems the fourth thread 218 is not able to do anything while waiting for access to the inode table 200, embodiments of the present disclosure leverage the known, fixed file size to perform a more efficient file system consistency check when there are more available threads in the thread pool 210 than there are available connections to the inode table 200. In some embodiments, the first three threads 212-216 perform a traditional fsck process. In other words, the first three threads 212-216 will begin reading the inode information of its responsible fixed set of inode rows. Meanwhile, the fourth thread 218, which is free in the node's thread pool and cannot take a lock on the inode table 200 due to the thread limit for the inode table 200, skips the first step of reading from the inode table 200. Instead, the fourth thread 218 calculates the next three files' block addresses using the fixed file size and collects the validity information for each file assigned to it. Once the validity information is collected, the fourth thread 218 waits for one of the first three threads 212-216 to finish.

For example, if the fourth thread 218 knows that the files have a fixed file size of four (with the units being arbitrary), that the third thread's 216 first inode address is 23068, and that each thread has three assigned inodes, it can predict its first inode address. To do so, the file size (4) may be multiplied by the number of inodes assigned to each thread (3), and the product (12) may be added to the first inode address for the third thread 216 (23068). This results in a predicted inode address of 23080 for the fourth thread 218, which is the correct inode address as shown in the inode table 200. Similarly, the fourth thread 218 can predict the inode address for its other two inodes by adding the offset (e.g., the file size) to its first inode address once for each additional inode.

While the fourth thread 218 is calculating the block addresses and collecting the validity information, each of the first three threads 212-216 validates its three inodes. After validating three inodes, the threads 212-216 die. Once one of the first three threads 212-216 dies, the fourth thread 218 can take a lock on the inode table 200 and start reading the information stored in its entries (e.g., for inode numbers 10, 11, and 12) in the inode table 200. The fourth threads 218 reads the inodes from the inode table 200 (i.e., performs step one of a traditional fsck process) and then jumps straight to step three, where it compares the already collected validity information with the entries in the inode table 200. In effect, the fourth thread 218 is able to skip step two since it was completed during its wait period (i.e., before it had access to the inode table 200). If any disparity found, then the fourth thread 218 performs a disk check.

The example shown in FIG. 2 leverages the fact that the file size is uniform and known/configured by the clustered file system. The example shown in FIG. 2 also leverages the fact that the clustered file system is configured to store all erasure code blocks corresponding to a file in a sequential fashion on the disk drive subsystem. In so doing, the example shown in FIG. 2 is able to perform some of the fsck steps during a thread's waiting time, thereby increasing the efficiency of the overall process.

Figure 3:
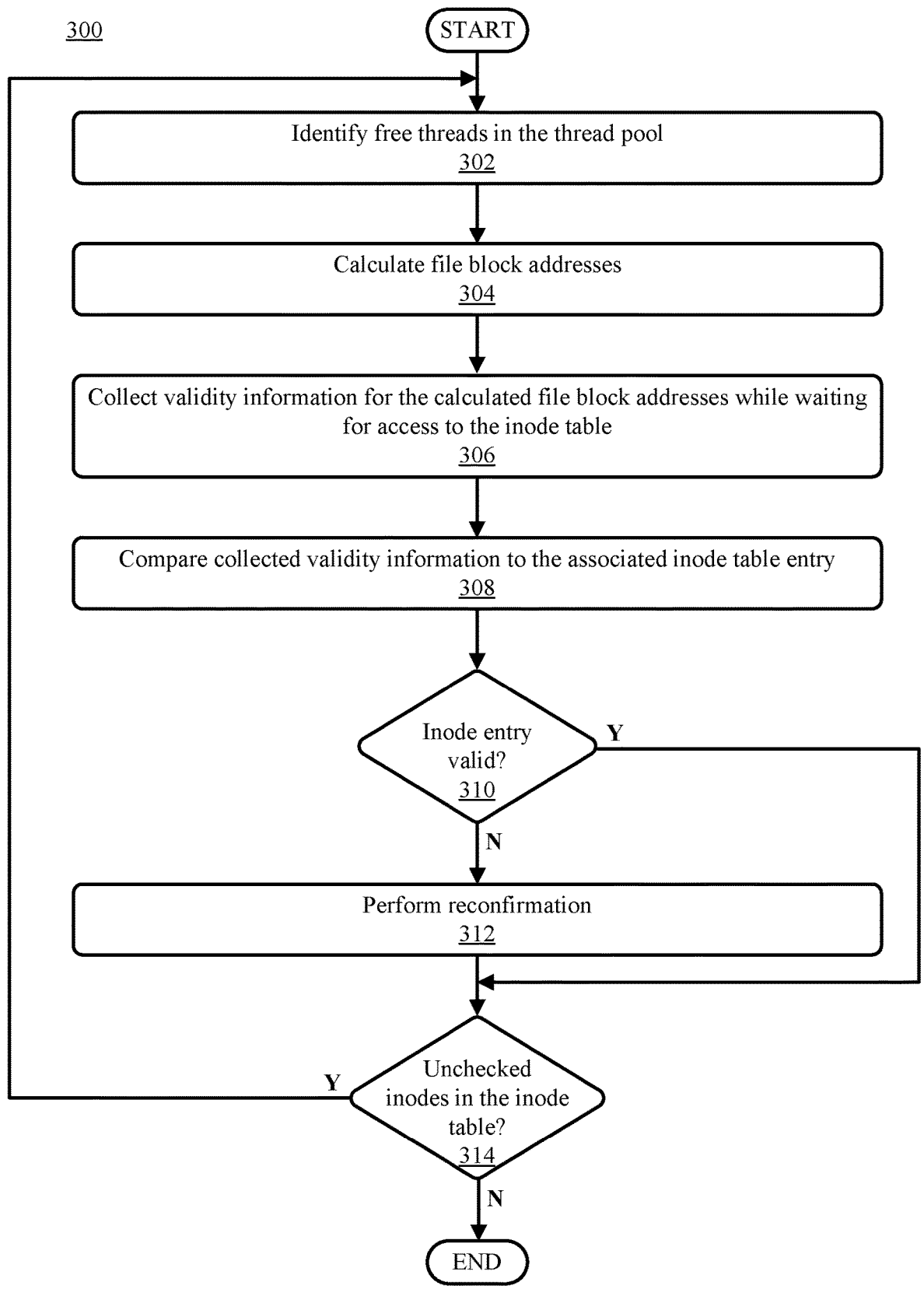
FIG. 3 illustrates a flowchart of an example method for performing a file system consistency check after reaching a thread limit for an inode table, in accordance with embodiments of the present disclosure.

Referring now to FIG. 3, illustrated is a flowchart of an example method for performing a file system consistency check after reaching a thread limit for an inode table, in accordance with embodiments of the present disclosure. The method 300 may be performed by hardware, firmware, software executing on a processor, or any combination thereof. For example, the method 300 may be performed by a processor or storage controller performing a fsck process on a cloud compute node (e.g., a storage node in a SAN).

The method 300 may begin after reaching a thread limit for an inode table. As used herein, the thread limit is the maximum number of connections to the inode table. For example, a thread limit of three indicates that the maximum number of threads that can access an inode table at the same time is three. Prior to reaching the thread limit, a system implementing the method 300 may perform a traditional fsck process. In other words, each thread may perform the following steps in order:

Step one: Read a row from the inode table.

Step two: Based on the read inode information, verify the block ranges from different disks.

Step three: Mark the inodes as corrupt or not corrupt in fsck table, or move the orphan data to "lost and found" directory.

These steps may be performed in sequence for every file by every thread spun by the fsck process prior to the thread limit being reached. Once the thread limit is reached, the processor (e.g., executing a fsck process) may begin performing the method 300.

The method 300 begins at operation 302, wherein a processor identifies free threads in a thread pool. The free threads are threads that are not currently being used by any process and which can be used to perform fsck operations. The threads may be shared among one or more applications or processes within the system, or they may be specifically marked for performing the fsck process. Once the free threads are identified at operation 302, each identified thread performs operations 304 through 312. For illustrative purposes, these operations will be discussed in the context of a single thread, though in some embodiments one or more threads may be performing operations 304 through 312 at the same (or overlapping) time.

At operation 304, the thread calculates the file block addresses (e.g., inode addresses) for the file(s) to which it is assigned. The thread uses its knowledge about the fixed file size, the sequential nature of the files, the number of files assigned to each thread, and/or its position in the thread queue to calculate its file block addresses. In some embodiments, the first block address assigned to the thread may be determined using Equation 1:

$$BAT1=BAT0+(file\_size*num\_files) \qquad \text{(Equation 1)}$$

wherein BAT1 is the first block address (e.g., inode address) assigned to the thread, BAT0 is the first block address assigned to the thread that immediately precedes the thread in the thread queue, file_size is the fixed file size for the file system, and num_files is the number of files each thread checks. If there are multiple threads between BAT0 and the thread, the part of Equation 1 that is in parenthesis can be multiplied by the number of threads prior to adding it to BAT0 to determine BAT1.

For example, referring back to FIG. 2, the fourth thread 218 can calculate its first inode address using the first inode address of the third thread 216. In this embodiment, BAT0 is 23068 (the first inode address assigned to the third thread 216), file_size is four (the gap between sequential inodes in the inode table 200) and num_files is three (the number of inodes assigned to each thread). Using Equation 1, the first block address for the fourth thread 218 is calculated as 23068+(4*3), or 23068+12, which equals 23080. This prediction matches what is in the inode table. If the fourth thread 218 were to calculate its first block address based on knowledge of the first thread's 212 first block address, the equation would be 23044+(4*3*3), or 23044+36, which again equals 23080. In this case, the second three in the equation comes from the number of threads between BAT0 and the fourth thread 218.

Returning to FIG. 3, at operation 306, the thread collects validity information for the calculated file block addresses. This may be performed by the thread prior to the thread getting access to the inode table. The thread may use the file block addresses calculated at operation 304 to identify areas of the disk that include the file(s) assigned to the thread, and it may access those areas of the disk to collect the validity information. After collecting the validity information for the calculated file block addresses, the thread waits until it can access the inode table.

After getting access to the inode table, the thread performs operation 308. At operation 308, the thread reads the information from its associated inode table entries. In some embodiments, the thread may also take a lock on the inode table to prevent other threads from accessing the thread's entries. The thread then compares the collected validity information to the associated inode table entries.

In some embodiments, the system marks threads that are accessing the inode table in a user descriptor table within the kernel memory. This may be done to enforce the thread limit so that any other thread cannot access the file's inode table unless the previous accessing threads complete their work related to the locked inode or die due to any other reason. This gives access to another waiting thread in the thread queue to the inode in the file's inode table by taking the lock on the inode table.

If the inode entries are valid ("Yes" at decision block 310), the thread may die. Additionally, the method 300 may continue to decision block 314 to determine whether there are any unchecked inodes (e.g., rows/entries) in the inode table. If there are additional inodes to be checked ("Yes" at decision block 314), the method 300 returns to operation 302. Otherwise ("No" at decision block 314), the method 300 may end.

If the inode entries are determined to not be valid ("No" at decision block 310), the method 300 continues to operation 312. At operation 312, the thread performs reconfirmation of the invalid inode entries. In other words, if an inode entry is not valid, the thread performs a traditional fsck process on it.

After performing reconfirmation at operation 312, the thread may die and the fsck process may proceed to decision block 314 to determine whether there are any unchecked inodes (e.g., rows/entries) in the inode table. If there are additional inodes to be checked ("Yes" at decision block 314), the method 300 returns to operation 302. Otherwise ("No" at decision block 314), the method 300 may end.

In some embodiments, the fsck process (e.g., computer module that handles execution of the fsck) identifies the file to be scanned first and assigns the file to one of the system's threads for further fsck scanning process. Each system thread goes to inode table and looks for the inode distribution on the disks in the case of a clustered file system.

FIG. 4 illustrates an example network architecture 400, according to embodiments. The network architecture 400 is presented only by way of example and is not intended to be limiting. The systems and methods disclosed herein may be applicable to a wide variety of different computers, servers, storage devices, and network architectures, in addition to the network architecture 400 shown.

As shown, the network architecture 400 includes one or more computers 402A, 402B, 402C, 402D, 402E, collectively computer 402, interconnected together by a network 404 with one or more server computers 406A, 406B, 406C, 406D, collectively server computer 406. The network 404 may include, for example, a local-area-network (LAN), a wide-area-network (WAN), the Internet, an intranet, or the like. In certain embodiments, the computers 402, 406 may include both client computers 402 and server computers 406 (also referred to herein as "host device").

In general, client computers 402 may initiate communication sessions (e.g., for transactions), whereas server computers 406 may wait for requests from the client computers 402. In certain embodiments, the computers 402 and/or server computers 406 may connect to one or more internal or external attached storage systems 412 (e.g., arrays of hard-disk drives, solid-state drives, tape drives, etc.). Computers 402 and 406, and direct-attached storage system 412 may communicate using protocols such as ATA, SATA, SCSI, SAS, Fibre Channel, or the like. One or more arrays of the storage system 412 may contain storage pools that may benefit from management techniques of the disclosure.

The network architecture 400 may, in certain embodiments, include a storage-area-network (SAN) 408 which is accessed through the server computers 406. The SAN 408 may connect the servers 406 to one or more storages, such as arrays 410-1 of hard-disk drives or solid-state drives, tape libraries 410-2, individual hard-disk drives 410-3 or solid-state drives 410-3, tape drives 410-4, (collectively storage 410), CD-ROM libraries, or the like. A connection may be through a switch, fabric, direct connection, or the like.

In certain embodiments, the servers 406 and storage 410 may communicate using a networking standard such as Fibre Channel (FC). In some embodiments, a connection may occur over SAN 408. One or more of the storages 410 may contain storage pools that may benefit from management techniques according to the disclosure.

For example, in some embodiments a server computer 406 may communicate over physical connections from one or more ports on the server computer 406, to one or more ports on the storages 410. In some embodiments, the storages 410 can be a single storage. In some embodiments, the plurality of storages 410 can be dispersed over a geographical area. In some embodiments, redundancy can exist such as when the storages 410 are a plurality of storages, which can be configured in a synchronous relationship, for example.

Figure 5:
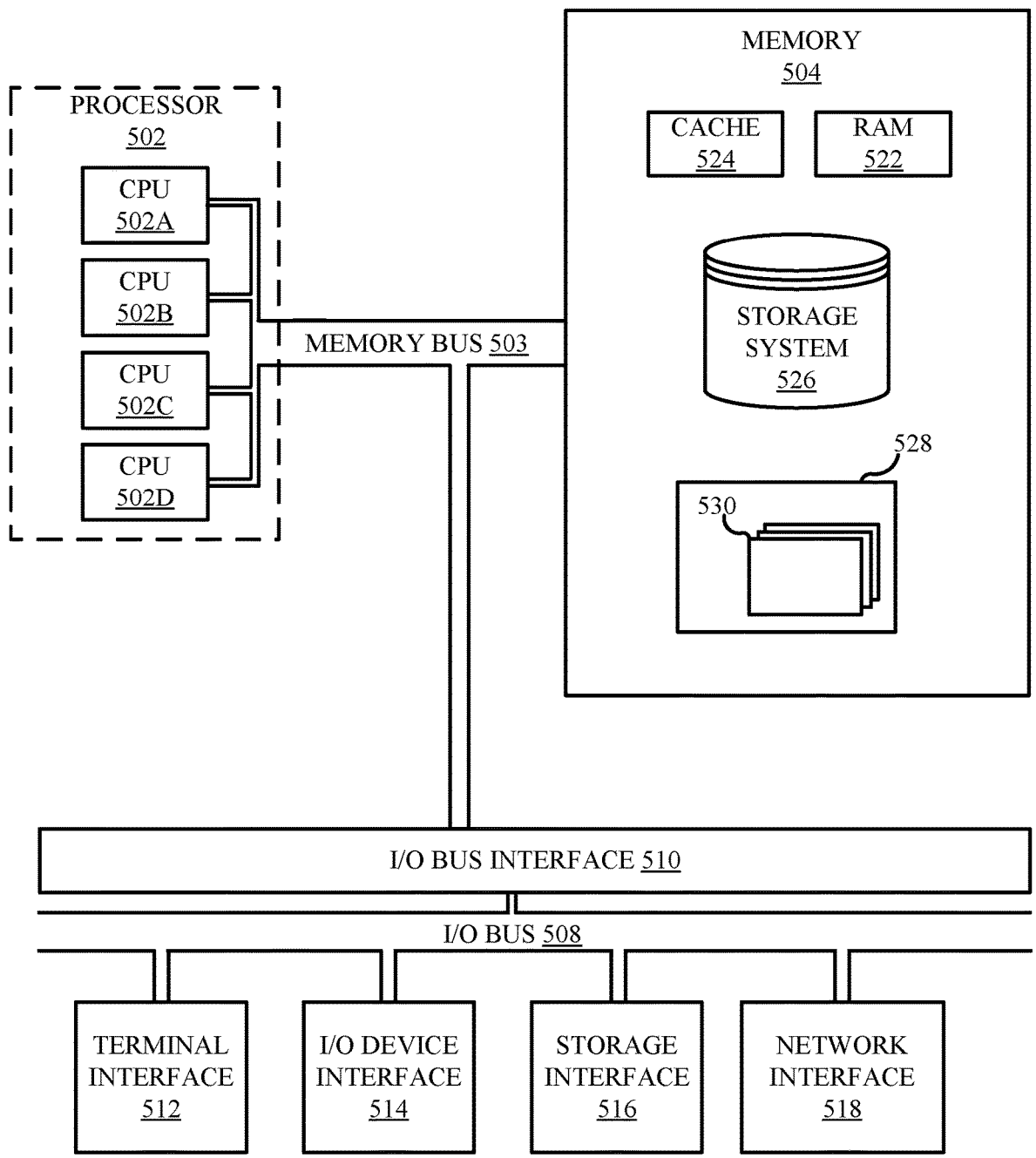
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
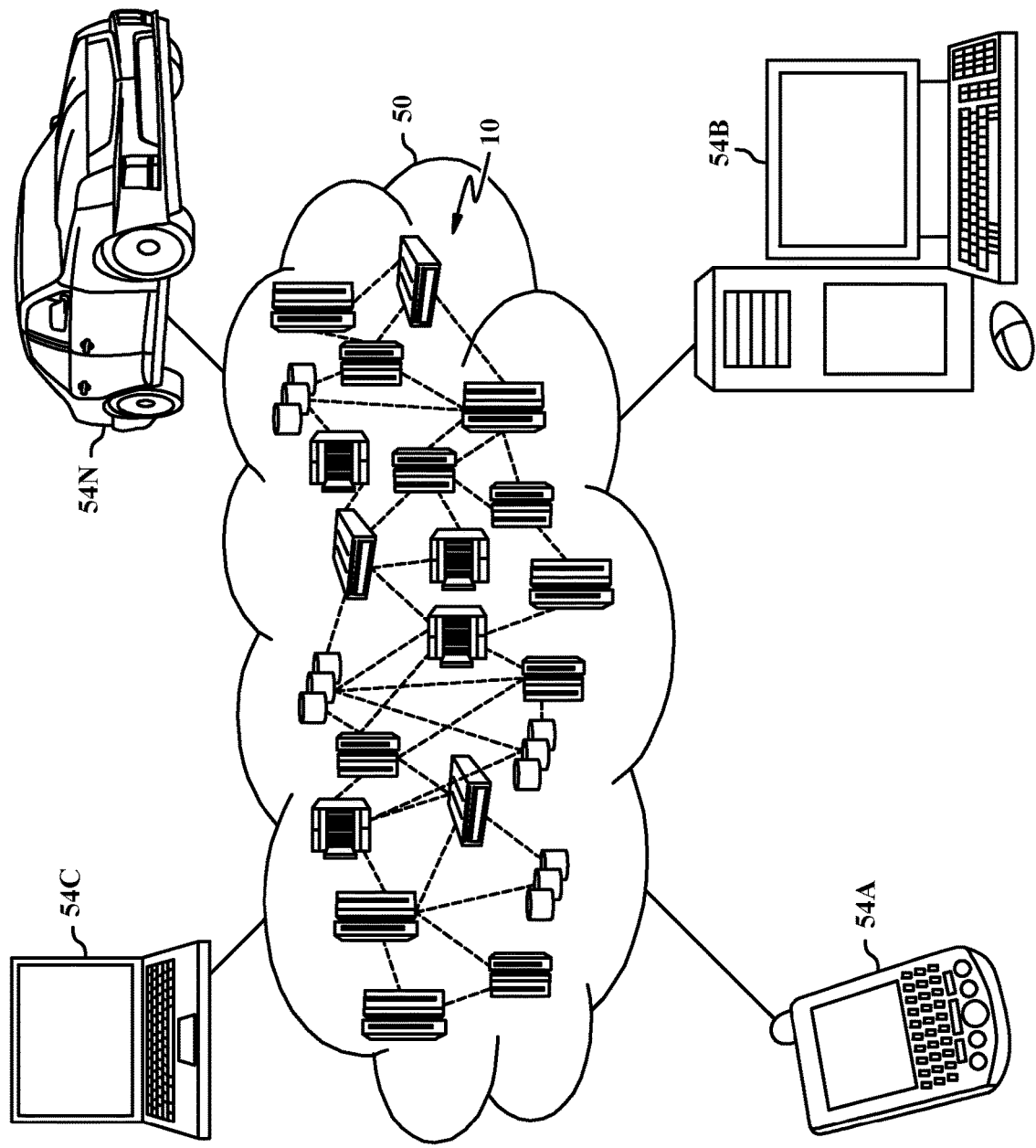
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
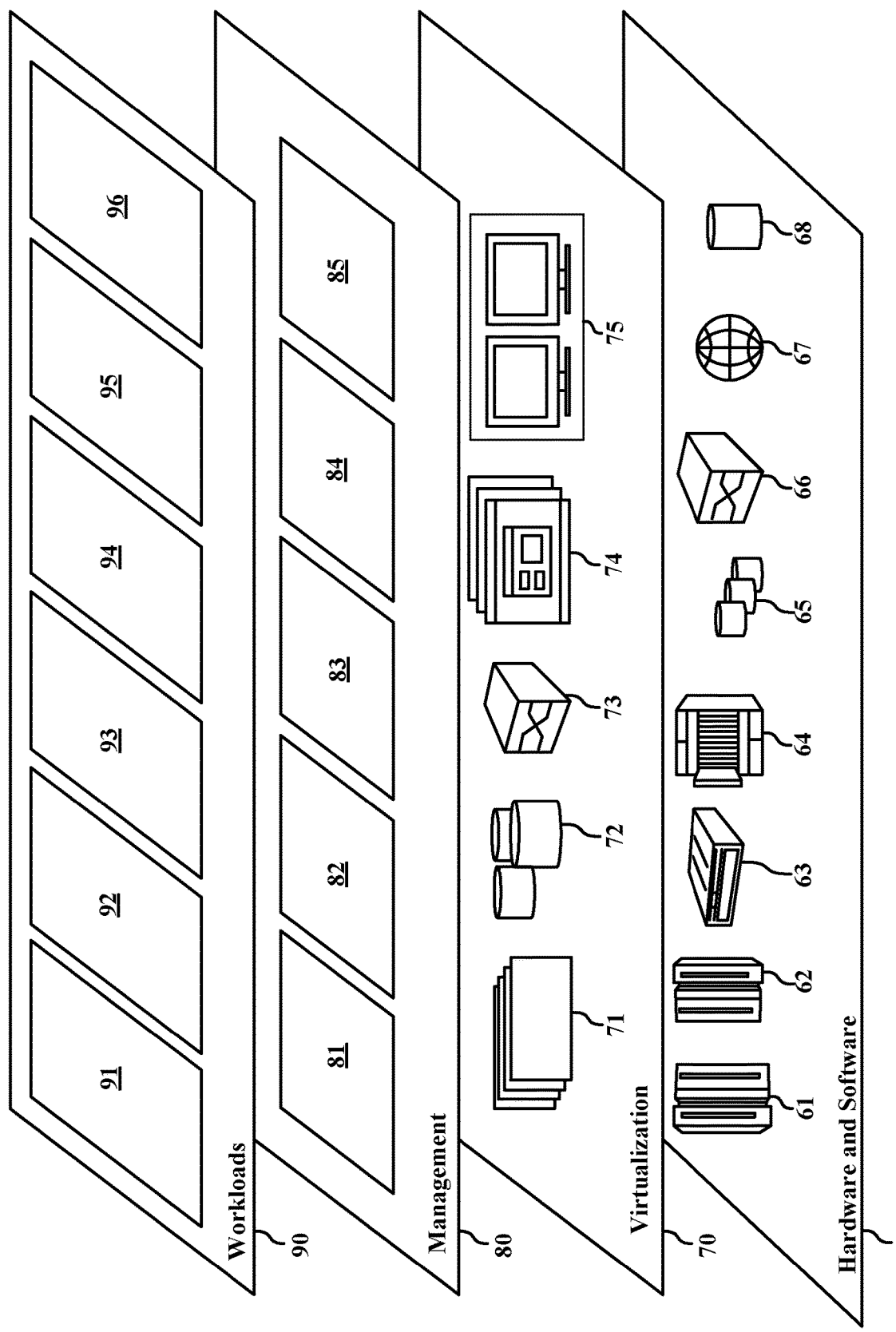
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 40 includes hardware and software components. Examples of hardware components include: mainframes 41; RISC (Reduced Instruction Set Computer) architecture based servers 42; servers 43; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

What is claimed is:

1. A method for performing a file system consistency check, the method comprising:
   calculating, by a first thread that does not have access to an inode table, file block addresses for one or more files to be checked by the first thread using information related to one or more other threads;
   collecting validity information for the one or more files;
   reading, in response to the first thread being given access to the inode table, information relating to the one or more files from the inode table, wherein the reading is performed after the calculating; and
   validating the information by comparing the information from the inode table to the validity information.

2. The method of claim 1, wherein the one or more files are in a clustered file system that includes a fixed file size, and wherein the file block addresses are predictively calculated using the fixed file size.

3. The method of claim 2, wherein the inode table includes an entry for each inode in the clustered file system, and wherein the inode table includes a thread limit that sets a maximum number of threads that are permitted to access the inode table at any given time.

4. The method of claim 3, wherein the calculating the file block addresses is performed in response to the first thread determining that the thread limit for the inode table has been met.

5. The method of claim 1, wherein the method further comprises:
   determining, in response to a second thread that has access to the inode table completing, that the first thread can access the inode table; and taking, by the first thread, a lock on the inode table, wherein the lock is stored in a user descriptor table within kernel memory.

6. The method of claim 1, wherein a file system consistency check process assigns the one or more files to the first thread.

7. The method of claim 1, further comprising:
marking, in response to determining that an inode is allocated despite not belonging to any files, the inode as free in an allocation map.

8. A system for performing a file system consistency check, the system comprising:
a memory; and
a processor communicatively coupled to the memory, wherein the processor is configured to perform a method comprising:
calculating, by a first thread that does not have access to an inode table, file block addresses for one or more files to be checked by the first thread using information related to one or more other threads;
collecting validity information for the one or more files;
reading, in response to the first thread being given access to the inode table, information relating to the one or more files from the inode table, wherein the reading is performed after the calculating; and
validating the information by comparing the information from the inode table to the validity information.

9. The system of claim 8, wherein the one or more files are in a clustered file system that includes a fixed file size, and wherein the file block addresses are predictively calculated using the fixed file size.

10. The system of claim 9, wherein the inode table includes an entry for each inode in the clustered file system, and wherein the inode table includes a thread limit that sets a maximum number of threads that are permitted to access the inode table at any given time.

11. The system of claim 10, wherein the calculating the file block addresses is performed in response to the first thread determining that the thread limit for the inode table has been met.

12. The system of claim 8, wherein the method further comprises:
determining, in response to a second thread that has access to the inode table completing, that the first thread can access the inode table; and
taking, by the first thread, a lock on the inode table, wherein the lock is stored in a user descriptor table within kernel memory.

13. The system of claim 8, wherein a file system consistency check process assigns the one or more files to the first thread.

14. The system of claim 8, wherein the method further comprises:
marking, in response to determining that an inode is allocated despite not belonging to any files, the inode as free in an allocation map.

15. A computer program product comprising a computer readable storage medium having program instructions embodied therewith, the program instructions executable by a processor to cause the processor to perform a method comprising:
calculating, by a first thread that does not have access to an inode table, using information related to one or more other threads that are assigned to check files, file block addresses for one or more files to be checked by the first thread;
collecting validity information for the one or more files;
reading, in response to the first thread being given access to the inode table, information relating to the one or more files from the inode table, wherein the reading is performed after the calculating; and
validating the information by comparing the information from the inode table to the validity information.

16. The computer program product of claim 15, wherein the one or more files are in a clustered file system that includes a fixed file size, and wherein the file block addresses are predictively calculated using the fixed file size.

17. The computer program product of claim 16, wherein the inode table includes an entry for each inode in the clustered file system, and wherein the inode table includes a thread limit that sets a maximum number of threads that are permitted to access the inode table at any given time.

18. The computer program product of claim 17, wherein the calculating the file block addresses is performed in response to the first thread determining that the thread limit for the inode table has been met.

19. The computer program product of claim 15, wherein the method further comprises:
determining, in response to a second thread that has access to the inode table completing, that the first thread can access the inode table; and
taking, by the first thread, a lock on the inode table, wherein the lock is stored in a user descriptor table within kernel memory.

20. The computer program product of claim 15, wherein a file system consistency check process assigns the one or more files to the first thread.

* * * * *